United States Patent [19]
Harvey

[11] 3,965,362
[45] June 22, 1976

[54] ENERGY SYSTEM FOR PRODUCTION OF HYDROGEN FROM WASTE INCINERATION

[75] Inventor: Gerald J. Harvey, Westbury, N.Y.

[73] Assignee: New York Testing Laboratories, Inc., Westbury, N.Y.

[22] Filed: Mar. 20, 1974

[21] Appl. No.: 452,683

[52] U.S. Cl. .............................. 290/1 R; 110/8 R; 60/648; 110/10
[51] Int. Cl.² .......................................... F23G 5/04
[58] Field of Search ................. 290/1 R, 10; 110/8, 110/10; 60/648

[56] References Cited
UNITED STATES PATENTS

| | | | |
|---|---|---|---|
| 1,779,549 | 10/1930 | Lawaczeck | 290/1 R |
| 2,036,613 | 4/1936 | Stuart | 290/1 R |
| 3,670,669 | 6/1972 | Hoad | 110/8 A |
| 3,832,144 | 8/1974 | Wieken et al. | 110/8 A |
| 3,837,302 | 9/1974 | Bersier | 110/8 R |

Primary Examiner—Robert K/ Schaefer
Assistant Examiner—John W. Redman
Attorney, Agent, or Firm—Ostrolenk, Faber, Gerb & Soffen

[57] ABSTRACT

Waste matter is incinerated utilizing pure oxygen in addition to the oxygen obtainable through ambient air thereby raising the temperature in the incinerator to an amount of the order of 500°F greater than the incinerator temperature normally encountered when only ambient air is introduced into the incinerator. The incinerator combustion gases are passed into a waste heat boiler to generate steam for operating a steam turbine incorporating an electric generator. A portion of the electric power developed by the generator is utilized in conjunction with an electrolytic cell structure to perform an electrolysis operation upon water to separate the water into its constituent parts (hydrogen and oxygen). A portion of the hydrogen is utilized in the burner plenum of the waste heat boiler to increase the temperature of the incineration combustion gases. The remaining pure hydrogen resulting from the electrolysis process is available for use as fuel or in the synthesis of hydrocarbons, petrochemicals and alcohols. The oxygen developed from the electrolysis process is pumped back into the incinerator serving as the pure oxygen source. Thus, the incineration of waste is employed to generate useful electric power, at least a portion of which is used to incinerate the waste at higher incineration temperatures not heretofore obtainable, thereby increasing the efficiency of the incineration operation and utilizing the heat generated thereby to create both electrical power and to develop pure hydrogen as a by-product thereof for use as fuel or for other purposes. By supercharging the burning of the waste at higher temperatures, stack emission is significantly reduced and a higher temperature for steam generation is produced.

12 Claims, 1 Drawing Figure

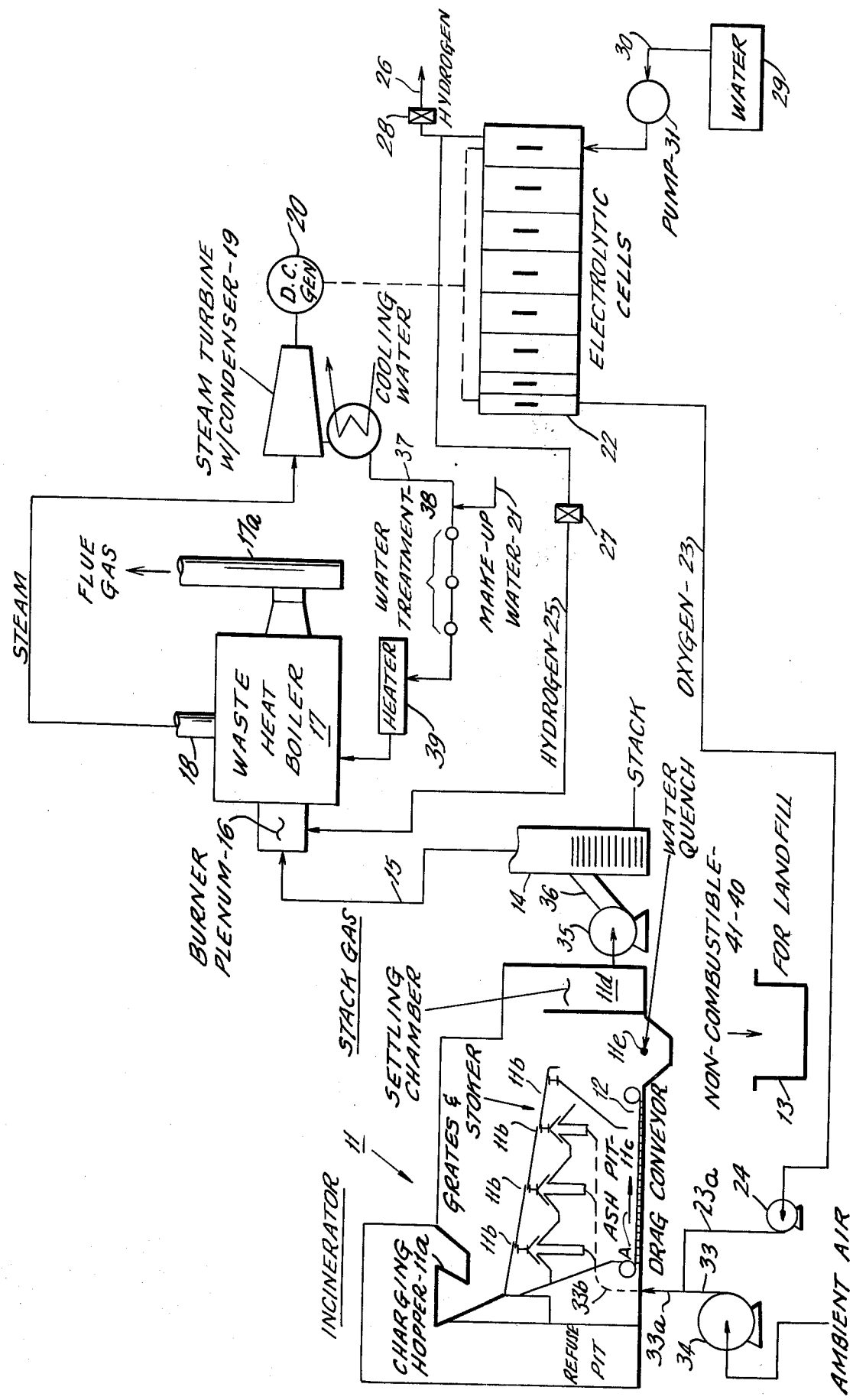

ENERGY SYSTEM FOR PRODUCTION OF HYDROGEN FROM WASTE INCINERATION

The present invention relates to the elimination of waste through incineration and the generation of electrical power and pure hydrogen and oxygen and more particularly to a system combining the above operations which cooperate with one another to increase the efficiency of incineration and to yield a higher electrical power output and a larger yield of hydrogen and oxygen in a wholly self-contained system.

BACKGROUND OF THE INVENTION

There presently exists prior art systems which burn or incinerate waste materials for the generation of electricity. There also exists techniques in the prior art for the electrolysis of water to separate the water into its separate components of hydrogen and oxygen through the use of d.c. electricity. However, no system presently exists which utilizes the above equipment in combination in a substantially closed-loop system wherein substantially pure oxygen and some of the substantially pure hydrogen produced as a result of the electrolysis operation is employed to supercharge the burning of any waste material to create a higher temperature thereby eliminating stack emission and to create a higher temperature for steam generation, as well as yielding a by-product in the form of the remaining pure hydrogen which can be used directly as a household fuel or can be synthesized into hydrocarbons, petrochemicals and alcohols (which constitute an easily storable energy liquid), as well as utilization of the products of the electrolysis operation to significantly increase system efficiency.

BRIEF DESCRIPTION OF THE INVENTION

This process involves the incineration of refuse and the utilization of the generated heat to produce electricity and power. The generated power is then used to electrolyze water into hydrogen and oxygen gases. The oxygen gas is then recycled into the incineration part of the system thereby increasing the efficiency of refuse burning to such a degree that very minimal air pollution is produced.

Part of the hydrogen gas is collected as the product of the system. This product can then be used as a fuel gas or for some other purpose.

Part of the hydrogen gas produced is ignited and mixed with the incinerator stack gas to further increase the available heat for power generation and also considerably reduce whatever contaminants are produced in the incineration step.

A BRIEF DESCRIPTION OF THE FIGURE AND OBJECT

It is therefore one object of the present invention to provide a novel method and apparatus for the incineration of garbage and other waste materials combined in a system which utilizes the heated gases developed from the incineration process to generate electrical power and to perform an electrolysis operation in which the oxygen and at least part of the hydrogen emitted as a result of the electrolysis operation is utilized to supercharge the burning of the waste at higher temperatures to eliminate stack emission thereby generating steam at a higher temperature and to yield a major portion of the hydrogen developed during the electrolysis operation as a by-product of the system together with the major portion of electrical power generated by the system.

The above as well as other objects of the present invention will become apparent from a consideration of the drawing which shows a schematic diagram of a system embodying the principles of the present invention.

DETAILED DESCRIPTION OF THE INVENTION

This new concept consists of three major portions, namely:

1. Incineration of refuse.
2. Utilization of generated heat to produce electricity.
3. Electrolysis of water to produce hydrogen and oxygen with the use of the generated electricity.

FIG. 1 shows the schematic flow diagram of the system.

Waste material is burned, for example, at the rate of 93.5 tons per hour in a series of incinerators (Class V-Municipal Incinerators, one such incinerator 11 being shown in the figure). Oxygen for the burning operation is supplied by the oxygen produced by the electrolysis step and oxygen from ambient air. The pure oxygen enters incinerator 11 through conduits 23 and 23a under control of blower 24. Ambient air enters incinerator 11 through conduits 33, 33a and 33b under control of blower 34. The total amount of pure oxygen ($O_2$) obtained from the electrolysis step is 500,000 SCFH thereby decreasing the amount of oxygen needed from the ambient air. The net result of this is the increased temperature level of the stack gases to 2300°F. at 150 percent excess oxygen.

Normal incineration processes utilize oxygen only from ambient air. Stack gases produced from this kind of burn (ambient air supply at 150 percent excess oxygen) produce a temperature of only 1800°F. This burn produces a considerable amount of fly ash and some unburned hydrocarbons. On the other hand, utilization of pure oxygen to supplement ambient air supply, as described in this system, produces minimal contaminants due to the increased burning temperature.

The waste material burned in this system is a typical collection from any city, town or country. The average heating value of the refuse is 6000 BTU per pound and the approximate composition of such waste material is as follows:

|  | Wt.% |
|---|---|
| Moisture | 50 |
| Non-combustibles | 22 |
| Combustibles | 28 |

The incinerators require a total of one square foot of grate area per 80 to 85 pounds of waste material. Each incinerator has a net combustion chamber of 15 cu. ft. per ton of capacity.

Waste material is charged into a hopper located at the top of 11a of the incinerator 11 and then drops onto the grates 11b. Movement of the materials inside the combustion chamber is controlled by a series of stokers 11b. As combustion takes place, residue and non-combustibles are constantly dropping into the ash pit 11c. Water is introduced at 11e to quench the residue. A drag conveyor 12 moves all the materials in the direction of arrow A to be quenched and then deposited into a storage bin 13 for disposal. This residue is in the rubble form due to the high burn temperature.

During combustion, the following chemical reactions take place:

1. $C + O_2 \rightarrow CO_2$

2. $2H_2 + O_2 \rightarrow 2H_2O$

The ratio of $C:H_2$ in the combustible portion of the refuse is approximately 5:1. With this ratio, the stoichiometric amount of oxygen required is 5847 moles. Since all incinerators of this class require 150% excess oxygen, the total amount of oxygen supplied is 11,694 moles. A total of 1295 moles is supplied by the electrolytic cell product and the balance is taken from ambient air.

Under these operating conditions, the cumbustion gas attains a temperature of 2300°F. and has the following composition:

|        | Vol., % |
|--------|---------|
| $CO_2$ | 5.8     |
| $H_2O$ | 15.3    |
| $O_2$  | 16.6    |
| $N_2$  | 62.3    |
|        | 100.0   |

The total volume of gas produced is 24,281,081 standard cu. ft. per hour (SCFH at 70°F. and 1 atm).

The combustion gas flows into the settling chamber 11d of the incinerator where fly ash if any, is deposited, and on to a series of stacks such as, for example, stack 14, by means of blower 35 and conduit 36, the stack having a total area of 565 square feet.

These stacks are then manifolded by conduits 15 in a plenum 16 where hydrogen, from the electrolytic cells, is fed at the rate of 700,000 SCFH and ignited. The resulting gas mixture attains a final temperature of approximately 2600°F. Under these conditions, all carbonaceous materials present are completely burned.

The gas mixture is then fed into a waste heat boiler 17 producing a total of 690,000 pounds of steam at a pressure of 1450 psia and a temperature of 1000°F. The gas mixture fed into the boiler has the following composition:

|        | Vol., % |
|--------|---------|
| $CO_2$ | 5.7     |
| $H_2O$ | 18.2    |
| $O_2$  | 14.8    |
| $N_2$  | 61.3    |
|        | 100.0   |

The produced steam is then monitored through header 18 into a steam turbine generator system comprised of a steam turbine and condenser 19 and a generator 20 capable of delivering 100 megawatts of electricity. The steam turbine is a reheat type. Steam from the turbine is condensed, pumped back into a water treatment plant and on to the boiler again. Only make-up water due to losses is added to the system, at input 21. The water passes through conduit or pipe 37, and undergoes water treatment at 38 to eliminate impurities such as metals and their salts. The temperature is raised to the order of 450°F. by heater 39 whereupon the water reenters boiler 17.

The generated steam operates steam turbine 19. Flue gas developed by boiler 17 is exited through flue 17a.

A small fraction of the generated electricity produced by generator 20 is used to run all pumps (such as pumps 24, 31 and 35 and fan 34), condensers and other auxiliary equipment. The bulk of the generated electricity is then used to disassociate water into hydrogen and oxygen inside the "filter press" electrolytic cells 22. Water is pumped into cells 22 from a reservoir 29 through conduit 30 under control of pump 31.

These cells are constructed just like a filter press with a diaphragm material. The operating voltage is between 1.23 volts and 1.48 volts. The hydrogen produced is 1,000,000 SCFH and the oxygen produced is 500,000 SCFH. The operating temperature is held in the range of 170° – 180°F. To facilitate electrolysis, a 28% KOH solution is added into the system. Under this set of conditions, the current efficiency of the cell is 96 – 99%.

The oxygen produced is fed into the incinerator 11 through conduit 23 by blower 24. Part of the hydrogen product is used to increase the temperature of the incinerator combustion gases in plenum 16 from 2300°F. to 2600°F. and the remaining hydrogen gas is available for use as fuel. The hydrogen gas is transferred to plenum 16 by conduit 25 while the remaining hydrogen gas is made available at conduit 26. If desired, metering valves 27 and 28 may be employed to control the amount of hydrogen gas passed through conduits 25 and 26.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A closed loop method for producing electric power and pure hydrogen comprising the steps of
   a. combining waste material with ambient air and substantially pure oxygen;
   b. burning the combined matter in an enclosed region to develop heated gaseous material;
   c. mixing the heated gaseous matter with substantially pure hydrogen and igniting the resulting mixture and introducing the ignited mixture into a boiler to generate steam;
   d. operating a turbine by the steam generated by the boiler;
   e. operating a generator by said turbine to generate electric power;
   f. utilizing a portion of the electric power to energize an electrolytic cell structure;
   g. supplying said structure with water to enable the structure to produce substantially pure hydrogen and oxygen, all of said oxygen being that oxygen employed in the combining operation of step (a);
   h. feeding a portion of the hydrogen produced through step (g) to the steam generator wherein the said portion of hydrogen is that hydrogen employed in the mixing step (c);
   said method steps resulting in the burning of waste material at a higher temperature to reduce residue, resulting in the production of useful electric power and further resulting in the production of hydrogen in excess of that used in step (c) for subsequent utilization as a fuel or for other diverse purposes.

2. The method of claim 1 further comprising the step of treating the condensed water and make-up water to eliminate impurities, metals and their salts before reintroducing the water into the steam generator.

3. The method of claim 2 further comprising the step of preheating the treated water to raise its temperature prior to reintroducing the water in the steam generator.

4. The method of claim 1 wherein step (c) further comprises the steps of introducing the heated gaseous matter and the substantially pure hydrogen into a burner plenum prior to ignition thereof to raise the temperature of the resulting mixture and then introducing the heated mixture into the steam generator.

5. The method of claim 1 wherein step (a) further comprises adding to the air an amount of said substantially pure oxygen sufficient to raise the temperature of the burning combined matter to a value of the order of 2300°F.

6. The method of claim 1 wherein the amount of hydrogen employed in step (c) is sufficient to heat the ignited mixture to a temperature substantially greater than the temperature at which the combined matter is burned during step (b).

7. The method of claim 5 wherein the amount of hydrogen employed in step (c) is sufficient to raise the temperature of the ignited mixture to a value of the order of 2600°F.

8. Apparatus forming a closed-loop system for generating electric power and for producing pure hydrogen as a by-product of the apparatus comprising:
first means for receiving and incinerating waste matter such as garbage;
second means for introducing ambient air into said first means at a first predetermined rate;
third means for introducing pure oxygen into said first means at a second predetermined rate;
boiler means for receiving heated gases developed by said first means as a result of the incineration operation;
fourth means for introducing pure hydrogen into said boiler means at a third predetermined rate whereby said pure hydrogen is admixed and ignited with said heated gases to thereby increase the temperature of the mixture introduced into said boiler means to a level greater than the burning temperature in said first means;
said boiler means including means for generating steam responsive to the heated gas mixture;
a steam turbine being operated by the steam generated by said boiler means;
an electric generator being operated by said steam turbine;
an electrolytic structure and means for supplying water to said structure;
fifth means coupling a portion of the electric power developed by said generator to said electrolytic structure for producing pure hydrogen and pure oxygen from the water supplied thereto;
sixth means coupling a portion of the hydrogen produced by said electrolytic structure to said fourth means;
means coupling all the oxygen produced by said electrolytic structure to said third means, whereby the pure oxygen is mixed with ambient air in said first means to increase the burning efficiency of said first means and the said portion of the pure hydrogen produced is mixed with said heated gases in said boiler means to increase the temperature of the mixture introduced into said boiler means to eliminate contaminant emission from said boiler means and to increase the amount of electric power produced by said apparatus as well as to produce pure hydrogen as a by-product whereby the excess of hydrogen which is not fed to said boiler means may be utilized as a fuel or for other diverse purposes.

9. The apparatus of claim 8 further comprising a plenum coupled between said first means, said fourth means and said boiler means and for receiving heated gases from said first means for receiving substantially pure hydrogen from said fourth means and admixing these gases and introducing the mixture into said boiler means.

10. The apparatus of claim 8 wherein said sixth means further comprises means for regulating the amount of hydrogen supplied to said boiler means.

11. The apparatus of claim 8 further comprising condenser means coupled to said turbine means from said boiler means and seventh means for reintroducing the condensed water into said boiler means.

12. The apparatus of claim 11 further comprising means coupled between said eighth means and said boiler means for treating said water to eliminate impurities, metals and their salts.

* * * * *